United States Patent [19]

Boivin

[11] 4,140,632
[45] Feb. 20, 1979

[54] CONCENTRATOR DEVICE AND METHOD

[75] Inventor: Joseph R. G. Boivin, Grand'mère, Canada

[73] Assignee: Consolidated-Bathurst Limited, Montreal, Canada

[21] Appl. No.: 803,295

[22] Filed: Jun. 3, 1977

[30] Foreign Application Priority Data

Aug. 6, 1976 [CA] Canada .................................. 258562

[51] Int. Cl.$^2$ ........................ B01D 21/26; B04C 5/04
[52] U.S. Cl. .................................... 210/84; 209/144; 209/211; 210/512 R
[58] Field of Search ............... 210/512 R, 512 M, 84; 209/211, 144

[56] References Cited

U.S. PATENT DOCUMENTS

| | | | |
|---|---|---|---|
| 2,920,761 | 1/1960 | Freeman et al. | 209/211 |
| 2,927,693 | 3/1960 | Freeman et al. | 209/211 |
| 3,337,050 | 8/1967 | Labecki | 209/211 |
| 3,347,372 | 10/1967 | Bouchillon | 209/211 |

Primary Examiner—Frank Sever
Attorney, Agent, or Firm—Ian Fincham

[57] ABSTRACT

The invention provides a method and apparatus for thickening centrifugally separable fractions by the steps of providing a pressurized stream of a liquid suspension medium containing a fraction separated centrifugally from any other fraction, causing the stream of the suspension to flow in the form of an annular helical vortical flow, passing the stream of the suspension through a restricted opening, allowing the stream of the suspension to expand into a larger volume contained within a converging confining zone converging in the direction of stream flow and towards the discharge zone having a restricted opening of a size smaller than the size of the first-mentioned restricted opening, regulating the flow of the stream of the suspension to form and maintain the stream as a first vortex of the suspension flowing towards the discharge zone whereby a portion of the suspension reverses direction in the converging zone adjacent the restricted opening of the converging zone and forms a second vortex flowing towards the first-mentioned restricted opening, withdrawing a thickened suspension through the restricted opening of the discharge zone, and withdrawing the second vortex containing the suspension expressed by the thickening action through the first-mentioned restricted opening.

6 Claims, 2 Drawing Figures

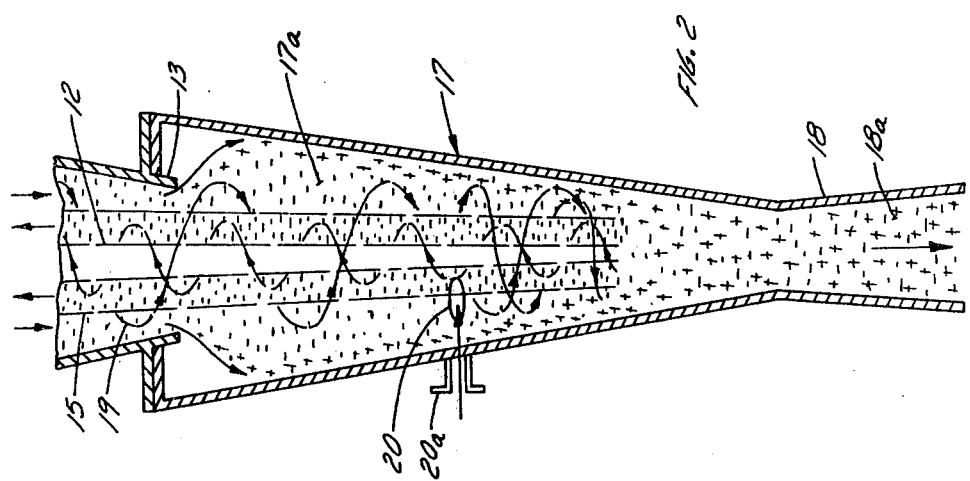
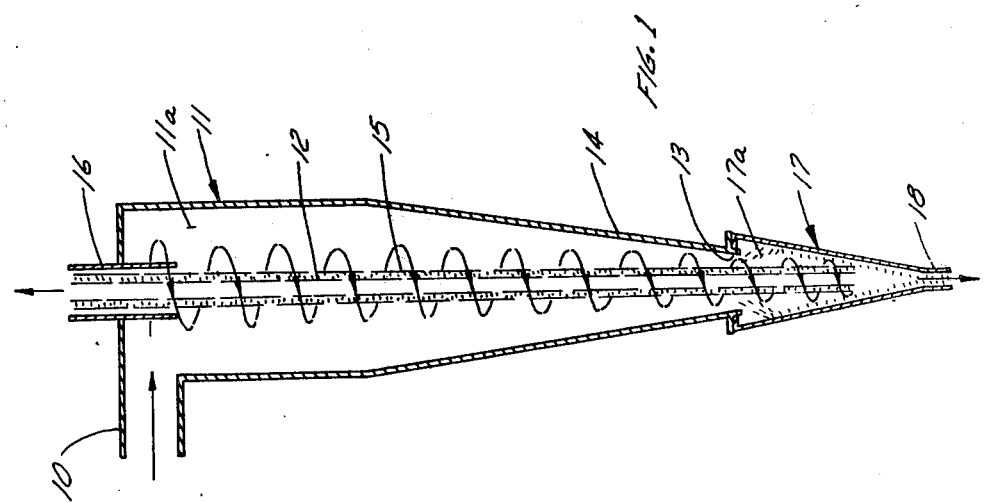

CONCENTRATOR DEVICE AND METHOD

This invention relates to the thickening and/or fractionation of centrifugally separable materials.

More particularly, this invention relates to a method and apparatus for continuously separating various particles in a suspension medium into two streams centrifugally and subsequently thickening and/or concentrating one of these streams such that the expressed suspension medium joins the other stream and/or fractionating this same stream so that a particular particle fraction of the stream also joins such other stream within the same apparatus, simultaneously and centrifugally.

Centrifugal vortex separators or hydroclones as they are known, have been in extensive use for some time where any heavy, generally undesirable particles, such as dirt, are removed from liquid or liquid suspensions such as paper pulp suspensions. The heavy particle fraction is generally referred to as the rejects fraction and the less heavy as the accepts fraction. However, in prior art separators, the percent of suspended solids of the rejects fraction is not as high as might be desired and generally, it is desired to obtain as high as possible of the percent solids.

Moreover, the rejects fraction from the prior art separators often contains material which would best either be in a separate fraction or incorporated with the accepts fraction. But, attempts to separate this material have not been very successful and when tried, have led to further dilution of the rejects and accepts fractions. Thus, it would be desirable to separate the material without the dilution of the rejects and/or accepts fractions.

With this invention, applicant has developed an apparatus and method capable of thickening and/or fractionating centrifugally separable materials to overcome the disadvantages of prior art separators and at the same time possesses many advantageous features of its own. In greater detail, with the method and apparatus of the present invention, there is thus provided a technique for concentrating the various fractions both from a purity and from an overall percent solids point of view utilizing what might be referred to as a "concentrator" or concentration step in the process of thickening and/or fractionating centrifugally separable materials.

In explanation of the present invention, the invention utilizes chambers in which a fluid to be treated is introduced, and maintained in the form of high velocity vortices, from which one portion of the fluid containing a first group of particles and forming a first stream is withdrawn from one end of a first chamber (into which the fluid has been introduced) and a second portion of the fluid containing a second group of particles and forming a second stream is withdrawn from the other end of the apparatus into a second special conical chamber where this second stream is thickened and the suspension medium expressed from this second stream is allowed to leave the second chamber counter-current to the flow of this second stream through the upper entrance end of the second chamber and to join the first stream, and the second stream is allowed to pass through the lower exit end of the second chamber. Alternately, or in addition to the thickening process, the particles in the second stream can be further fractionated in this second special chamber by introducing a suspension medium into the second chamber such that a particular fraction of these particles are separated from the thickened stream and allowed to leave the second chamber at the upper end counter-current to the entering stream and join the first stream leaving the upper end of the first chamber; the remaining portion of the thickened stream, minimally diluted by the suspension medium, is then allowed to leave the lower end of the second chamber.

Broadly, the present invention provides a method for thickening centrifugally separable fractions which comprises the steps of providing a pressurized stream of a liquid suspension medium containing a fraction separated centrifugally from any other fraction, causing the said stream of said suspension to flow in the form of an annular helical vortical flow, passing the said stream of the suspension through a restricted opening, allowing the said stream of said suspension to expand into a larger volume contained within a converging confining zone converging in the direction of stream flow and towards the discharge zone having a restricted opening of a size smaller than the size of said first mentioned restricted opening, regulating the flow of said stream of said suspension to form and maintain said stream as a first vortex of said suspension flowing towards said discharge zone whereby a portion of said suspension reverses direction in said converging zone adjacent said restricted opening of said converging zone and forms a second vortex flowing towards said first mentioned restricted opening, withdrawing a thickened suspension through said restricted opening of said discharge zone, and withdrawing said second vortex containing said suspension expressed by said thickening action through said first mentioned restricted opening.

This invention also provides an apparatus for thickening centrifugally separable fractions which comprises an elongated conical chamber or zone of a generally circular cross-section, a restricted opening in said chamber at one end thereof adapted to receive an annular helical vertical flow of suspension containing a liquid suspension medium and one fraction which has been centrifugally separated from any other fraction, said chamber forming a confining zone converging from said restricted opening to a discharge zone in said chamber having a restricted opening of a size smaller than the size of said first-mentioned restricted opening of said chamber, the diameter of the chamber having a greater diameter at said first-mentioned restricted opening and converging towards said second-mentioned restricted opening of said discharge zone whereby a flow of said suspension, passing through the first-mentioned restricted opening, into the larger volume converging confining zone, sprays against and thickens on the converging sides of the confining zone and is adapted to leave the confining zone through the restricted opening of the discharge zone.

In a still further embodiment of the present invention, there is provided a method for thickening centrifugally separable fractions and for further fractionating one of the fractions which has been centrifugally separated from the other or another fraction, which comprises the steps of providing a pressurized stream of a liquid suspension medium and one fraction which has been centrifugally separated from another fraction, causing said stream of said suspension to flow in the form of an annular helical vortical flow, passing said stream of said suspension through a restricted opening, allowing said stream of said suspension to expand into a larger volume contained within a converging confining zone converging in the direction of stream flow and towards a discharge zone having a restricted opening of a size smaller than the size of said first-mentioned restricted opening, whereby said suspension is thickened on the converging sides of said confining zone, regulating the flow of said stream of suspension to form and maintain said stream as a first vortex of said suspension flowing towards said discharge zone whereby a portion of said suspension reverses direction adjacent said discharge zone and forms a second vortex flowing towards said first-mentioned restricted opening, introducing substantially tangentially into said confining zone a flow of a liquid suspension medium to further fractionate the second suspension in said confining zone containing the said one fraction by washing-out a further fraction, allowing said last-mentioned fraction to join said second vortex, withdrawing the remaining second suspension partially diluted by said suspension medium through said restricted opening of said discharge zone, and withdrawing said second vortex containing the suspension medium expressed by the thickening action and said further fraction through said first-mentioned restricted opening of said confining zone.

In greater detail of the apparatus of the present invention, the apparatus is adapted to be mounted in operative relationship to, for example, a hydroclone or the like type of device — or even to a holding tank or other equipment capable of feeding a source of the liquid suspension to the apparatus; to this end, the device of this invention can be attached to the discharge outlet of the hydroclone by any suitable means — or in the case of holding tank, by any like suitable means. The apparatus preferably comprises an elongated conical chamber of generally circular cross-section having a restricted opening or inlet located generally centrally at the larger end of the chamber. The inlet, preferably located centrally, is adapted to receive an annular helical vortical flow of the suspension and has a diameter or is sized to be smaller than the diameter or size of the conical chamber at the large end of the conical chamber — i.e., the diameter of the larger end of the conical chamber is substantially larger than the diameter of the restricted opening into the chamber through which the feedstock is fed.

The converging wall of the conical chamber converges towards a discharge zone at the opposed end of the chamber to the inlet or restricted opening end and the discharge zone terminates in a further opening of a restricted dimension which in turn, is smaller than, and preferably substantially smaller than, the diameter of the first-mentioned restricted opening. In practice, the diameter of the first-mentioned restricted opening will depend on various factors — e.g., the size of the vortex chamber, the type of material being treated and the overall intended use of the device. In general, the diameter of the restricted opening, preferably of a generally circular nature, is smaller than the diameter of any chamber from which the feed-stock is fed into the concentrator device — and preferably the diameter is not larger than the outlet of any such feed-stock device. In the case of a hydroclone, which includes an initial generally circular non-tapering or converging portion, the diameter of the restricted opening of the concentrator device may be expressed as being between about one-third to about one-sixth of the maximum diameter of such device — preferably somewhere between about one-quarter to about one-fifth of the size of such a device.

In like manner, the outlet or discharge opening, which forms a restricted opening in the discharge zone of the concentrator device, is smaller than the opening of the feed-stock opening at the opposed end of the concentrator. The smaller the opening, for the discharge outlet, the greater the tendency for the fraction leaving the concentrator is to thicken — i.e. the greater the tendency is to have a higher percentage solids content. However, conversely, the smaller the outlet, the greater the tendency is for the outlet to plug under certain operating conditions and for this reason, to those skilled in the art, the actual diameter may be chosen depending on the type of material, the size of the chamber for the feed-stock, the degree of concentration desired, and the purpose for which the concentrator is being used. Also, if desired, means for aiding in the removal of the material being discharged may be employed — such as a screw discharge device located at the outlet for withdrawing thickened fractions.

Still further, according to further embodiments, means for applying a vacuum to the device of the present invention, so as to maintain sub-atmospheric pressure conditions within and about the low pressure gas core formed within the concentrator, may be employed to remove dissolved air in the various fractions.

The concentrator may be made from various types of materials depending upon the material to be processed, etc. — the choice of such materials being readily obvious to those skilled in the art. In constructing the concentrator, the angle of the slope, as measured through the vertical axis of the concentrator, may vary considerably and will depend on several factors such as the size of the restricted opening at the larger end of the concentrator, the size of the restricted opening in the discharge zone and other factors such as the pressure drop across, e.g., the hydroclone that the device is intended to be used with. Typically, the degree of slope may range from about 5° to about 20° with ranges from about 7° to 15° being preferred.

In the above description, and as will be evident from the attached drawings, the concentration aspect of the present invention will be seen to be useful for the concentration of the percentage solids of one of the fractions — however, this may be varied to include the concentration of the purity of the fraction being thickened, or focusing on the particle fraction being removed from the thickened fraction, it will be readily seen that the fraction being concentrated or consolidated is the fraction leaving through the upper end of the concentrator. This may be accomplished by introducing, substantially tangentially into the concentrator, a flow of a suspension medium which further fractionates the thickened suspension by washing out a further fraction and subsequently allowing the washed-out fraction to join the ascending vortex next to the gas core. Introduction of a further flow of a suspension medium into the concentrator may be effected by providing a suitable inlet as means for introducing the further flow into the concentrator. The inlet may be located at an appropriate point on the converging sides of the concentrator but it is preferred that the location of the inlet be between the middle third of the distance between the point where the flow initially enters the concentrator and the point where the sides of the concentrator stop converging.

The method and apparatus of the present invention provide a useful and economical means for increasing the concentration of suspensions — and at the same time, provide increased control over the amount of solids that would normally be discharged as waste material. Thus, the device is useful in the treatment of reducing the amount of pollution which is normally associated with mill effluents.

Having thus generally described the invention, reference will now be made to the accompanying drawing, illustrating preferred embodiments and in which:

FIG. 1 is a diagrammatic illustration of an apparatus suitable for carrying out the method of thickening a rejects fraction, and illustrating the concentrator in combination with a hydroclone; and FIG. 2 is an enlarged view of a portion of the apparatus of FIG. 1, illustrating a modification to the apparatus and the manner in which the device operates.

Referring to the drawings, a hydroclone is illustrated and indicated generally by reference numeral 11; the hydroclone includes an inlet 10 for receiving a flow of liquid, or suspension, under pressure. The hydroclone includes an upper chamber 11a, the lower portion of which includes a downwardly and inwardly tapering lower portion. The upper chamber 11a of the hydroclone 11 has a generally substantially circular cross-section and is adapted to convert at least 50 percent or so of the inlet pressure energy of the liquid or suspension being fed into the device, into velocity energy.

The lower portion 14 of the hydroclone is provided with a restricted outlet indicated generally by reference numeral 13, and in turn, connected to the lower end of the hydroclone 11 is the concentrator. The concentrator is indicated generally by reference numeral 17 and includes a vortex chamber 17a, the upper portion of which communicates with a restricted opening 13 of the hydroclone and the lower portion of which includes an outlet indicated by reference numeral 18.

In use, a liquid or liquid containing a stream of suspended particles to be fractionated, enters through the tangential inlet 10 into the first vortex chamber 11a. Due to the shape of the chamber, the liquid or suspension is caused to form and maintain a helical downwardly-extending flowing vortex around the inside wall of the chamber 11a — and at the same time, to form a gas space 12 along the central axis of the chamber. The restricted opening 13 of the lower portion of the hydroclone 14 will thus function to turn back a portion of the centifugally treated suspension to form a helical flow 15 inside of, and surrounded by, the downwardly extending vortex and itself surrounding the gas core 12. The helical flow 15 will flow upwardly out of the first chamber to a suitable second axial outlet indicated generally by reference numeral 16 at the upper portion of the chamber 11a.

The liquid closely adjacent the small surfaces of the chamber 11a will, of course, lose some energy by shear forces against the wall; this liquid together with that portion or fraction of the particles separated by the centrifugal action from the other particle fraction(s) in the suspension, by having been thrown towards the walls, will pass downwardly along the hydroclone walls, and be discharged as a vortical stream of annular cross-section to the first lower axial outlet 13. As will be noted from the drawings, this axial outlet is positioned relative to the concentrator apparatus to discharge the particle fraction passing through the restricted outlet and to form it into a shape such that it "stands out" in a vortical fashion and sprays, with substantial energy, against the sloping sides of the chamber 17. The chamber 17, forming a second vortex chamber, functions to permit interaction between the particle fraction in the cone which will tend to thicken the fraction and the suspension medium thereby obtained will tend to fill the cone with a vortex of liquid. Thus, while the thickened layer of particles slides down the inner surface of the chamber 17a, towards a discharge opening 18 (which in effect forms a second restricted opening in axial alignment with the lower end of the separator 17), the liquid vortex formed within the chamber 17a tends to duplicate the vortex flow pattern of the first vortex chamber in that the restricted diameter or opening of the chamber 17a turns back a portion of the downwardly extending vortex of the suspension liquid to form an upper helical flow (similar to that of flow 15) which will surround the extension of a gas core 12 into the second vortex chamber 17a — and in turn, which will pass up through the restricted opening 13 into the vortex chamber 17a to join the upwardly moving vortex 15. In this manner, there is thus obtained a thickened particle fraction which leaves the apparatus by means of the outlet 18 and a suspension medium which leaves the apparatus by means of outlets 13 and 16.

While reference in the drawings is made to a hydroclone 17, it will be understood by those skilled in this art that this is only one manner of introducing an annular helical vortical flow of suspension into a vortex chamber 17a, functioning as a concentrator. Other embodiments may also be employed for this purpose, and to this end, a common vortical flow that could be used with the concentrator is that flow leading through an axial outlet at the bottom of a tank provided with a conically shaped discharge portion. Thus, when it is desired to draw off sedimentary material from the bottom of such a tank, by attaching a concentrator to the axial outlet and allowing a vortex to develop as the sediment is drawn off through the concentrator, the flow of sediment leaving the bottom of the concentrator will be thicker than it would be without the concentrator.

FIG. 2 illustrates an alternate embodiment of the present invention, with similar reference numerals to that of FIG. 1 being employed, to designate common components or portions. In FIG. 2, there is illustrated an annular helical vortical flow of a suspension introduced into a conical vortex chamber 17a through a restricted axial opening or inlet 13 at the upper end of the chamber, whereby a central gas core 12 and two separate vortices indicated by reference numerals 15 and 19 constitute the vortical flow. The vortex 15 is an upwardly moving vortex surrounding a gas core 12 and containing the suspension medium and the particle fraction that is to be further separated from the fractions contained in the downwardly flowing vortex 19. The axial outlet 13 is as described above, positioned relative to chamber 17a such that the particle fraction, contained in vortex 19, sprays against the sloping sides of the chamber 17a and thickens as it moves downwardly on the sloping walls to leave the chamber through the restricted lower outlet 18.

As illustrated in FIG. 2, the outlet may also be modified compared to that of FIG. 1, wherein the lower portion of the outlet 18, indicated by reference numeral 18a, gradually tapers outwardly to provide an eductor effect. Still further, if desired, where the apparatus is used to process a fraction that is sufficiently thick, it may be desirable to locate a screw discharge device at the outlet in order to assist with the withdrawal of a thickened fraction in a uniform and steady manner.

The device of FIG. 2 also illustrates an embodiment wherein there is included means in the concentrator 17 for introducing a flow of a suspension medium. To this end, there may be provided an inlet 20a in the side wall of the concentrator 17 communicating with the chamber 17a to introduce a flow of a suspension medium. In this respect, the suspension medium may be introduced at any desired inlet point along the walls of the chamber 17a — the introduction of the additional suspension in a manner substantially tangentially into the chamber 17a causes the flow of suspension to mingle with the thickened fraction moving down the slopes of the chamber 17a so as to wash out, of the thickened fraction, those particles undesired in the fraction to thereby increase the purity of and/or concentrate in purer form the fraction destined to leave the chamber through the outlet 18, while at the same time a portion of the suspension medium, and the washed out fraction, joins the ascending vortex 15 to leave chamber 17 by way of the outlet 13. To avoid undue dilution of the already thickened fraction, the amount of suspension medium injected through the inlet 20 should preferably be kept to a minimum as excessive amounts of medium will increase the fluid pressure within the chamber 17a resulting in a back pressure which throttles the flow through the outlet 13, which in some cases may be underirable.

When utilizing the present invention, and in situations where the fraction leaving the hydroclone, through the outlet 16 and the outlet 18 is to be treated further and where the presence of dissolved air in this fraction is detrimental to any further treatment, it has been found advantageous to apply a vacuum to the low pressure gas core formed within the hydroclone and concentrator, so as to maintain sub-atmospheric pressure within and about the core to remove a large percentage of the dissolved air in the various fractions which are being subjected to further treatment. Thus, any suitable device for this purpose, well known to those skilled in the art, may be employed.

The following examples will serve to illustrate the invention further:

EXAMPLE 1

An apparatus according to the invention, and as shown in FIG. 1, was constructed and in this example, the effluent from the bark drainer (the effluent being maple and poplar) of a pulp and paper mill was processed through the apparatus illustrated in FIG. 1 with the differential fluid pressure between the flow to inlet 10 and the outlet 16 being 50 pounds per square inch. Other characteristics of the apparatus, and variations thereof in different runs, are shown in the accompanying Table I which also illustrates the results obtained. In the following Table, the apparatus was varied to provide different diameters for different chambers, as otherwise noted.

TABLE I

| | | | |
|---|---|---|---|
| Diameter of barrel of chamber 11a | 10 inches | 10 inches | 8 inches |
| Diameter of inlet 10 | 4 " | 4 " | 2 " |
| Diameter of outlet 16 | 4 " | 4 " | 2 " |
| Diameter of outlet 13 | 2.25 " | 2.25 " | 1.81 " |
| Diameter of upper end of chamber 17a | 4 " | 4 " | 4 " |
| Diameter of outlet 18 | 1 " | 1.5 " | .813 " |
| Slope angle of sides of chamber 17a (1) | 10° | 10° | 10° |
| Flow Usgpm thru inlet 10 | 400 | 400 | 180 |
| thru outlet 16 | 393.5 | 385.8 | 169.7 |
| thru outlet 18 | 6.5 | 14.2 | 10.3 |
| Total suspended Solids ppm thru inlet 10 | 5,320 | 2,580 | 2,230 |
| thru outlet 16 | 2,603 | 1,325 | 875 |
| thru outlet 18 | 171,116 | 36,720 | 24,595 |

(1) angle with respect to the vertical

As the outlet 18 of the chamber 17 (i.e., the concentrator) is made smaller the greater is the tendency for the fraction leaving the concentrator to thicken (i.e., have a higher percent solids content). On the other hand, the smaller the outlet the greater the tendency for the outlet to plug. In the general, the diameter of outlet 18 of chamber 17 will be smaller than the outlet 13 of chamber 11 (or, i.e., the inlet 13 of chamber 17). The actual diameter will depend on the type of material being treated, the size of the hydroclone 11, the degree of concentration desired and the purpose to which the concentrator 17 is being used.

The diameter of outlet (or inlet) 13 will depend on the size of the vortex chamber or hydroclone 17 but like outlet 18, the diameter will also depend on the type of material being treated and the overall application of the device. In general, the diameter will be substantially smaller than the diameter of the barrel section of chamber 11. In the above example, the ratio between the diameter of the outlet and the diameter of the chamber was approximately 0.23 or the outlet was roughly one quarter the size of the chamber, and a suitable typical range for differing applications is one third to one sixth the diameter of the chamber with a preferred range being one quarter to one fifth.

The diameter of the larger or upper end of cone or concentrator 17 will depend to some extent on the size of the inlet 13 and other factors, such as the differential pressure across the hydroclone. In the above example, the ratio of the diameter of the large end to the inlet was roughly 2 for a differential of 50 psi; in other cases a ratio of 3 or 4 was found satisfactory. If the ratio is too great the sides of the cones will be too far away from the spray and the energy or force of the spray will be dissipated before the fraction reaches the sides. In general, the ratio can lie in the range of 1.5 to 4 with preference towards a lower value for the ratio.

From Table I, it will also be seen that this invention, in terms of pollution abatement, provides very useful teachings in reducing the suspension solids of mill effluents. Thus, as will be seen from Table I, where the material through outlet 16 is useful (i.e., recoverable) material, then by using the present invention, not only at least one half of the suspended solid material, previously normally discharged as waste, is recovered but the remainder is greatly reduced in volume because of the thickening effect. In fact, in the case involving the rejected high solids material (from outlet 18) the percent sold (e.g., 17% — Table I) was sufficiently high that the material could be removed by truck in semi-solid form and used as landfill.

EXAMPLE II

The following example is an example relating to the embodiment of FIG. 2. In this Example II, the apparatus of FIG. 2 in combination with a hydroclone was employed, in conjunction with pulp material. In this respect, as is known by those skilled in this art, in most pulp mills, the pulp is processed through screens and hydroclones to remove unwanted fibrous material and grit, and all this rejected material is finally accumulated and sent to the sewer or disposed of in some way. If most of the "unwanted" fibrous material could be separated from the grit it could be reprocessed into useful fiber. While this material could be processed through a conventional hydroclone to remove this grit, the "accepted" fraction (i.e., that passing through outlet 16 in FIG. 1), would be dilute and would generally not contain sufficient fiber to make it economically worthwhile. However, if this rejected material is processed by the method and apparatus of the present invention a substantial portion of this fibrous material can be recovered for subsequent use.

In this Example, the data in the accompanying Table II clearly illustrates the invention further and its usefulness relative to the above. In this respect, it should be noted that while the embodiment of the concentrator 17 shown in FIG. 1 does recover a substantial portion of the fibrous material (free of grit) (e.g., approximately 50%) the embodiment of FIG. 2 allows this portion to be increased substantially (e.g., to nearly 90% contaminated with a very small percentage of grit). Since the non-gritty material left in the "rejects" fraction is of a very undesirable nature (bark particles, etc.) the device of this invention can to all intents and purposes practically recover nearly 100% of the useful fiber in this previously rejected material. Thus, in effect the concentrator of FIG. 2 concentrates the grit (e.g., from 4% to 15%), and "non-grit" material (e.g., from 51% to 88%). The percent solids concentration in the "rejects" is not as evident here as Table I because the addition of suspension medium for the FIG. 2 embodiment dilutes the "rejects" and the recovery or subtraction of fiber from the "rejects" decreases the solids and this masks the thickening effect of the concentrator. In any event, it has been calculated that the "% solids" of the "rejects" is higher with the device of the present invention than it would be if a conventional hydroclone had been used to remove the grit and a comparable split of the non-grit assumed.

reservoir in which the suspension medium would flow and which would act as a continuous source of elutriating medium to penetrate the curtain of rejected solids flowing down the face of a truck and thereby wash the lighter fibrous material out into the ascending vortex where it will be reclaimed as recoverable fiber.

It will be understood that various modifications may be made to the above-described embodiments, without departing from the spirit and scope of the invention as defined herein.

I claim:

1. A method of thickening and separating centrifugally separable fractions which comprises the steps of providing a pressurized stream of a liquid suspension medium containing a gritty fraction separable centrifugally from another non-gritty, fibrous fraction, causing said stream to flow in the form of an annular helical vortical flow, passing said stream through a restricted opening, allowing the stream to expand into a conical chamber with a converging confining zone converging in the direction of stream flow and towards a discharge zone having a restricted opening of a size smaller than the size of said first-mentioned restricted opening, regulating the flow of said stream to form and maintain said stream as a first vortex of said suspension flowing towards said discharge zone whereby a portion of said suspension reverses direction in said converging zone adjacent said restricted opening of said converging zone and forms a second vortex flowing towards said first-mentioned restricted opening, introducing substantially tangentially into said conical chamber, at a single point in the middle third of the distance between the first-mentioned restricted opening and the discharge zone, a flow of liquid suspension medium which further fractionates a thickened suspension portion containing the said gritty fraction by washing out said non-gritty, fibrous fraction and allowing it to join the said second vortex, withdrawing the remaining thickened suspen-

TABLE II

| | | "REJECTED" PULP MILL MATERIAL PROCESSED THROUGH THE EMBODIMENT ILLUSTRATED IN: | | | | |
|---|---|---|---|---|---|---|
| | | % of SS FED TO DEVICE PRESENT IN | % GRIT PRESENT IN THE SS OF | PRESSURE PSI AT | FLOW USGPM | % SS |
| FIGURE I | FEED | 100 | 2 | 50 | 344 | .50 |
| | ACCEPTS | 51 | 0 | 9 | 322.8 | .31 |
| | REJECTS | 49 | 4 | 11 | 21.2 | 4.0 |
| FIG. II | FEED | 100 | 2 | 50 | 340 | .40 |
| | ACCEPTS | 82 | 0 | 10 | 324.7 | .31 |
| | REJECTS | 18 | 11 | 16 | 15.3 | 1.64 |
| | FEED | 100 | 2 | 50 | 340 | .38 |
| | ACCEPTS | 85 | .05 | 10 | 327.4 | .31 |
| | REJECTS | 15 | 13 | 17.5 | 12.6 | 1.6 |
| | FEED | 100 | 2 | 50 | 340 | .40 |
| | ACCEPTS | 88 | .25 | 10 | 330.4 | .33 |
| | REJECTS | 12 | 15 | 19 | 9.6 | 1.74 |

NOTES:
"Feed" that passing through inlet 10
"Accepts" that passing through outlet 16
"Rejects" that passing through outlet 18
"Pressure" that at the inlet of feed, outlet of accepts and in chamber 17 (rejects).
% = % by weight
SS = Suspended Solids
Grit = sand, metal particles, alundum etc.

From the above Table, it will be seen that the present invention provides a very significant recovery compared to conventional hydroclones.

The embodiment of FIG. 2 may be further modified by the creation of an annulus/trench all the way around the cone, beginning at the point where the suspension medium enters tangentially. This trench could be, e.g., approximately three-quarters of an inch wide by one-quarter of an inch deep with sloping sides similar to a shallow dish. This trench would provide a water pad/- sion containing said gritty fraction partially diluted by said suspension medium through said restricted opening of said discharge zone, and withdrawing said second vortex containing the suspension medium expressed by said thickening action and said non-gritty, fibrous fraction axially through said first-mentioned restricted opening.

2. A method as defined in claim 1, in which a gas core is maintained within the annular input vortex and is sustained about the central axis over a major portion of the chamber.

3. A method as defined in claim 1, wherein a vacuum is applied to said core.

4. A method for centrifugally fractionating particles in a liquid suspension medium into at least a gritty fraction and a non-gritty fibrous fraction, and for thickening said gritty fraction, comprising the steps of tangentially introducing the suspension containing said fractions into a first vortex chamber having a restricted diameter upper outlet and a first restricted diameter axially lower outlet, discharging from said first lower outlet an annular helical vortical flow of the suspension containing a portion of said liquid suspension medium into the large end of a substantially uniformly tapering conical second vortex chamber of circular cross-section having a second restricted diameter axially lower outlet at the small end of said second chamber, wherein the ratio of the diameter of said large end to the diameter of said first lower outlet is between 4:1 and 1.5:1 and the diameter of said second lower outlet is smaller than the diameter of said first lower outlet, allowing said suspension to spray out into said large end and to thicken on the sloping sides of said conical chamber to form a thickened suspension containing said gritty and non-gritty fractions, regulating the flow of said suspension to maintain a first vortex of suspension flowing towards the small end of said conical chamber reversing in direction adjacent to said small end and forming a second vortex flowing towards the upper outlet within said first vortex, introducing into said second vortex chamber, at a single point in the middle third of the distance between the said first lower outlet and said second lower outlet, a flow of liquid suspension medium which further fractionates the thickened suspension containing the said gritty fraction by washing out said non-gritty, fibrous fraction and allowing it to join said second vortex withdrawing the remaining thickened suspension containing said gritty fraction partially diluted by said suspension medium through said second lower outlet and withdrawing said second vortex containing the suspension medium expressed by said thickening action and said non-gritty, fibrous fraction axially through said first lower outlet and into said first vortex chamber and eventually out through said upper outlet in said first chamber.

5. A method as defined in claim 4, in which a gas core is maintained within the said annular helical vortical flow and is sustained about the central axis over a major portion of the second chamber and a vacuum is applied to said gas core.

6. A method as defined in claim 4, wherein said liquid suspension medium is provided from the discharge of a hydroclone.

* * * * *